United States Patent
Washko et al.

(10) Patent No.: US 10,934,855 B2
(45) Date of Patent: Mar. 2, 2021

(54) TURBINE BLADE OF GAS TURBINE HAVING CAST TIP

(71) Applicant: DOOSAN HEAVY INDUSTRIES & CONSTRUCTION CO., LTD., Changwon-si (KR)

(72) Inventors: Jeremy Lyle Washko, Humble, TX (US); Glenn David Turner, Seabrook, TX (US); Matthew Charles Lau, Shoreacres, TX (US)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 246 days.

(21) Appl. No.: 16/131,034

(22) Filed: Sep. 14, 2018

(65) Prior Publication Data
US 2020/0088043 A1    Mar. 19, 2020

(51) Int. Cl.
*F01D 5/14* (2006.01)
*F01D 5/18* (2006.01)
*F01D 5/30* (2006.01)

(52) U.S. Cl.
CPC ............ *F01D 5/187* (2013.01); *F01D 5/147* (2013.01); *F01D 5/3007* (2013.01); *F01D 5/141* (2013.01); *F05D 2230/21* (2013.01); *F05D 2230/237* (2013.01); *F05D 2240/307* (2013.01); *F05D 2250/712* (2013.01); *F05D 2260/201* (2013.01); *F05D 2260/202* (2013.01)

(58) Field of Classification Search
CPC .................................................... F01D 5/187
See application file for complete search history.

(56) References Cited

U.S. PATENT DOCUMENTS

| | | | | |
|---|---|---|---|---|
| 4,411,597 A | * | 10/1983 | Koffel | B23P 6/005 416/224 |
| 8,091,228 B2 | * | 1/2012 | Hiskes | F01D 5/005 29/889.1 |
| 9,273,561 B2 | * | 3/2016 | Lacy | F01D 5/186 |

(Continued)

FOREIGN PATENT DOCUMENTS

| | | |
|---|---|---|
| JP | 2005201242 A | 7/2005 |
| JP | 2015524895 A | 8/2015 |

(Continued)

OTHER PUBLICATIONS

A Korean Office Action dated Dec. 12, 2019 in connection with Korean Patent Application No. 10-2018-0122485.

*Primary Examiner* — Eldon T Brockman
(74) *Attorney, Agent, or Firm* — Invenstone Patent, LLC

(57) ABSTRACT

Provided is a turbine blade of a gas turbine including a turbine blade part having an airfoil shape including an internal cavity therein, a cast tip disposed at an upper portion of the turbine blade part, and a braze joint to attach the turbine blade part and the cast tip to each other. The turbine blade part and the cast tip has substantially the same cross-sectional shape in a top plan view. In addition, the turbine blade part further includes a protrusion disposed at a surface where the turbine blade part is attached to the cast tip. In a similar manner, the cast tip may have a concave portion at a surface where the cast tip is attached to the turbine blade part to allow the concave portion to be coupled to the protrusion of the turbine blade part.

17 Claims, 6 Drawing Sheets

(56) References Cited

U.S. PATENT DOCUMENTS

| | | | | |
|---|---|---|---|---|
| 10,370,975 B2* | 8/2019 | Roberts | ............... | F01D 5/147 |
| 10,502,063 B2* | 12/2019 | Weaver | ............... | B22F 5/04 |
| 10,677,067 B2* | 6/2020 | Weaver | ............... | B23H 11/00 |
| 2005/0102835 A1* | 5/2005 | Trewiler | ............... | F01D 5/005 |
| | | | | 29/889.1 |
| 2014/0037458 A1* | 2/2014 | Lacy | ............... | F01D 5/186 |
| | | | | 416/97 R |
| 2017/0107823 A1* | 4/2017 | Roberts | ............... | F01D 5/147 |
| 2018/0087385 A1* | 3/2018 | Weaver | ............... | B23P 15/04 |

FOREIGN PATENT DOCUMENTS

| | | |
|---|---|---|
| JP | 2017082772 A | 5/2017 |
| KR | 20160142196 A | 12/2016 |

* cited by examiner

… … …

TURBINE BLADE OF GAS TURBINE HAVING CAST TIP

TECHNICAL FIELD

Exemplary embodiments of the present invention relate to a turbine blade or bucket of a gas turbine, and more particularly, to a turbine blade or bucket of a gas turbine having a replacement cast tip at an end portion thereof to make it easy to restore the damaged turbine blade.

BACKGROUND

A turbine is a mechanical device that obtains rotational force by impulsive force or reaction force by using a flow of compressible fluid, such as steam or gas, and includes a steam turbine using steam, a gas turbine using high-temperature combustion gas, or the like.

The gas turbine is a rotary power engine that extracts energy from the flow of the combustion gas. The gas turbine includes a compressor, a turbine, and a combustion chamber. The compressed air pressurized by the compressor is mixed with fuel and then the mixture is combusted, such that high-temperature high-pressure combustion gas expands, and the turbine is driven by this expansion force. Energy from the gas expansion is transferred through a shaft as torque. This energy can be used to drive an aircraft, a generator, and so on.

The compressor is provided with an air inlet through which air is supplied to the compressor, and a plurality of compressor vanes and blades are disposed alternately in the compressor housing. The combustor supplies fuel to the air compressed by the compressor and ignites it with a burner to generate high-temperature high-pressure combustion gas.

A plurality of turbine vanes and turbine blades are disposed alternately in a housing of the turbine. Further, a rotor penetrating a center of the compressor, combustor, turbine and an exhaust is also provided therein.

Both ends and sometimes the middle of the rotor are rotatably supported by bearings. A plurality of disks are fixed to the rotor and the blades are connected to the rotor. Simultaneously, a drive shaft of, e.g., a generator is connected to an end of an exhaust chamber or in front of the compressor.

Since the gas turbine does not have a reciprocating mechanism such as a piston of a four-stroke engine, consumption of lubricating oil is extremely low due to the absence of a mutual friction part such as a piston-cylinder. The gas turbine is also advantageous in that the amplitude, which is a characteristic of reciprocating machines, is greatly reduced, thereby permitting high-speed rotational motion.

The thermodynamic cycle of a gas turbine ideally follows a Brayton cycle. The Brayton cycle consists of four phases including isentropic compression (adiabatic compression), static pressure heating, isentropic expansion (adiabatic expansion), and static pressure heat discharge. After taking in atmospheric air and compressing it to a high-pressure, a fuel is combusted in a static pressure environment to release heat energy. A high-temperature combustion gas is then expanded and transformed into kinetic energy, and an exhaust gas containing residual energy is discharged into the atmosphere. Likewise, the Brayton cycle consists of four processes, i.e., compression, heating, expansion, and heat discharge.

The operation of the gas turbine is briefly described. Air compressed in the compressor is mixed with the fuel and combusted to generate high-temperature combustion gas, and the combustion gas generated is injected into the turbine blades. The injected combustion gas passes through the turbine vanes and blades and generates rotational force in the turbine blades, which then transfers to the rotor coupled to the turbine blades resulting in rotation.

It is important to reduce the leakage of the combustion gas from the flow path to improve turbine efficiency. As part of design, thermal gaps are placed strategically throughout the gas turbine. Specifically, a thermal gap may be formed between the upper end of the turbine blades and the housing. This gap may be a path for the leakage of the combustion gas, and it is required to seal the gap to prevent such leakage.

SUMMARY

The turbine rotor disk has a circular plate shape and includes a plurality of coupling slots formed at the outer circumference thereof. The coupling slot has an uneven surface while having a fir tree-shaped cross-section.

The turbine blade is fastened to the coupling slot. The turbine blade has a plate-shaped platform part formed in the central portion thereof. The platform part has a side surface which is in contact with a side surface of the platform part of the adjacent turbine blade and serves to maintain the space between the blades.

A blade part may be provided on the platform part. The blade part has a blade shape that is optimized according to the specification of the gas turbine and includes a leading edge and a trailing edge. Based on the flow direction of the combustion gas, the leading edge is disposed in the upstream side and the trailing edge is disposed in the downstream side.

The cooling flow path may be extended outside the housing (external flow path) or extended through the rotor disks (internal flow path). The blade part has a plurality of cooling holes formed on the surface thereof. The cooling holes communicate with a cooling flow path formed inside the blade part and supplies cooling air to the surface of the blade part.

The radial end portion of the blade part is adjacent to the turbine housing, typically referred to as a shroud block or ring segment. The high-temperature and high-pressure combustion gas is injected into the turbine blade and the turbine blade is rotated using the energy of the combustion gas. Therefore, the leakage of the high-temperature high-pressure combustion gas results in the reduced efficiency of the turbine. To inhibit such a decrease in the turbine efficiency, a turbine tip clearance, which is an interval between the turbine blade formed along the radial direction of the blade part and the turbine housing, should be minimized to thereby improve the turbine efficiency.

Here, the turbine tip clearance may not remain uniform during the gas turbine service, but it may be changed due to the thermal expansion in the turbine blade due to the contact with the high-temperature combustion gas results in thermal growth differentials in turbine parts, rotor and cases causing tip contact with the shroud/ring segment or excessive clearance. When the turbine tip clearance is increased, the leakage of the combustion gas occurs, giving rise to reduction in the turbine efficiency. In the other hand, when the turbine tip clearance becomes smaller, the turbine blade rotating at high speed may make direct contact with the turbine housing, which may cause severe damage to the turbine blade presumably due to heating, friction, or oxidation therefrom.

In many design case a tip pocket is required for castability in blades/buckets with complex internal cooling scheme. A tip pocket may be formed at an upper end of the blade part and a tip plate covering the tip pocket may be installed on the upper end of the blade part. However, the upper end of the blade part, i.e., the tip plate and the tip pocket may be oxidized or damaged by high-temperature friction when the turbine blade encounters harsh operating conditions, such as heating due to the contact with the high-temperature high-pressure combustion gas or the reduced turbine tip clearance.

The turbine blade according to an embodiment of the present invention may be provided with a cast tip placed at the upper end of the blade part. The cast tip may be placed on the upper end of the blade part along the radial direction, and may have a cross-section formed that is substantially identical as the blade part. An assembly of the cast tip and the blade part may serve as a single turbine blade. Thus, the cross-section of the cast tip may be preferably in the form of an air foil shape like the blade part, and has a leading edge and a trailing edge.

The cast tip has a predetermined thickness, that is generally thicker than that of the conventional tip plate. The conventional tip plate is formed in a structure having a thin plate shape to cover the tip pocket. However, the cast tip preferably has a certain thickness to form a single turbine blade when it is combined with the turbine blade part.

The upper end of the blade part may often be oxidized or damaged due to the harsh operating conditions. Upon the breakage or degradation of the upper end of the blade part, the turbine blade having the cast tip may easily be restored by replacing the cast tip. Moreover, it is possible to preclude the problems of a surface treatment or a weight change by replacing the cast tip having the same dimension. Thus, the service life of the turbine blade may be enhanced.

The cast tip includes a slot at a surface coupled to the blade part to allow the cast tip and the blade part to be easily coupled to each other. Since the turbine blade rotates at high speed, it is important that the assembly of the cast tip and the blade part maintains a continuous air-foil shape when the cast tip is coupled to an upper portion of the blade part. Therefore, it may be necessary that the blade part and the cast tip have the same cross-sectional shape. Further, in order for them to be coupled with each other at the correct position, a slot may be formed a lower surface of the cast tip, whereas a protrusion may be provided on an upper surface of the blade part, i.e., the surface coupled to the cast tip.

The slot and the protrusion are in the form of a female slot and a male boss, respectively, having a substantially similar rectangular cross-section. However, according to an embodiment of the present invention, the female slot and the male boss of the cast tip and the blade part of the turbine blade, respectively, are not limited to the rectangular cross-section, but may be modified to various shapes to facilitate the coupling of the cast tip and the blade part.

The cast tip may be integrally formed with the tip plate so that a separate tip plate may not be necessary. For the turbine blade having the tip plate integrated into the cast tip, the maintenance of the turbine blade may be performed more simply and efficiently because the damaged cast tip can be simply replaced with a new one.

The cast tip is mounted to the upper surface of the blade part to form an integrated turbine blade. Accordingly, the cast tip is brought into contact with the high-temperature high-pressure combustion gas, and thus, proper cooling is required. To this end, the cast tip may further include cast tip cooling holes. The cast tip cooling holes provided in the cast tip may be formed to penetrate the cast tip in a radial direction of the turbine blade.

The cast tip cooling holes formed in the cast tip may be connected to the internal cavity or film cooling holes provided at the blade part to cool the blade part. Therefore, the turbine blade in which the blade part and the cast tip are integrated may be cooled more efficiently by flowing the compressed air extracted from the compressor through the cooling flow path connecting the internal cavity, the film cooling holes, and the cast tip cooling holes.

The cooling flow path of the cast tip according to an embodiment of the present invention should not be limited to the cast tip cooling holes. They may be modified into various other structures to cool the turbine blade and/or the cast tip, which eventually has an influence on increasing the turbine performance and service life.

Various methods may be used to securely couple the blade part with the cast tip according to an embodiment of the present invention. For example, a braze joint 186 may be formed on a surface where the cast tip and the blade part are attached to each other. The braze joint 186 is advantageous especially in terms of repairing the cast tip. Specifically, when the cast tip is oxidized or broken due to high-temperature or friction, the cast tip may be replaced instead of replacing the entire blade part. When the cast tip and the blade part are coupled by the braze joint 186, the broken cast tip may be easily separated from the blade part by apply heat therefor, and this makes it easier to repair the damaged cast tip.

Hereinafter, a procedure for replacing the cast tip of the turbine blade according to an embodiment of the present invention will be described in detail with reference to the accompanying drawings.

Upon the receipt of the turbine blade damaged during operation, the existing tip plate is removed from the turbine blade and a surface of the turbine blade is machined to the required specifications.

The blade part of the turbine blade and the cast tip are then heated, and the braze foil in a suitable size is disposed at one end of the blade part for the coupling of the blade part and the cast tip.

The cast tip is placed on the braze foil, and the slot and the protrusion as described above are aligned. In this process, it is required to maintain small gaps between the slot and the braze foil and between the braze foil and the protrusion to allow the braze foil to flow.

Then, by applying heat to the braze foil, the cast tip and the upper end of the blade part are attached to each other to thus form an assembly.

The brazing procedure is applied in Full Diffusion Transient Liquid Phase, and may be performed in a vacuum furnace having proper temperatures, ramp rates, and dwell time. The operating conditions of the furnace, i.e., temperatures, ramp rates, and dwell time, may be varied according to the coupling conditions for the cast tip and the blade part.

The assembly of the cast tip and the blade part is removed from the vacuum furnace, the excess braze are removed, and the coupling face are checked.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION OF THE DISCLOSURE

Figure 1:
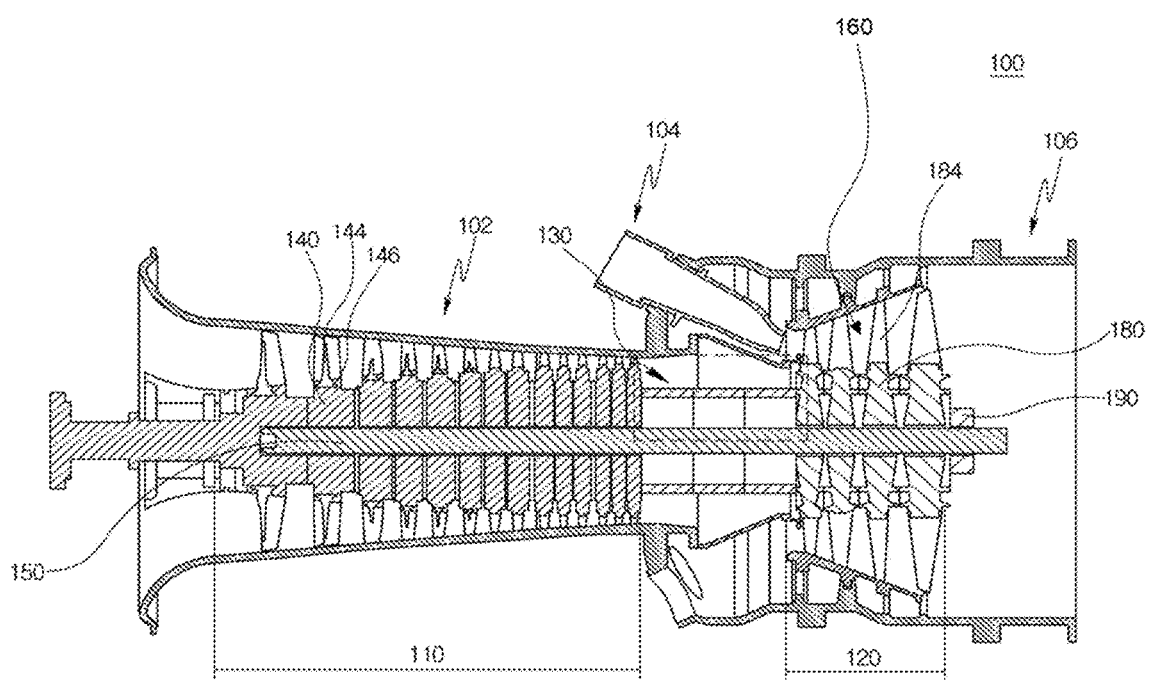
FIG. 1 is a view illustrating an overall structure of a gas turbine according to an embodiment of the present invention.

Hereinafter, exemplary embodiments will be described in greater detail with reference to the accompanying drawings. Regarding the reference numerals assigned to the elements in the drawings, it should be noted that the same elements will be specified by the same reference numerals, wherever possible, even though they are shown in different drawings. Also, in the description of exemplary embodiments, detailed description of well-known related structures or functions will be omitted when it is deemed that such description will cause ambiguous interpretation of the present disclosure.

It should be understood, however, that there is no intent to limit this disclosure to the particular exemplary embodiments disclosed. On the contrary, exemplary embodiments are to cover all modifications, equivalents, and alternatives falling within the scope of the exemplary embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," "including," "have/has," and/or "having," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, exemplary embodiments will be described in detail with reference to the accompanying drawings. The configuration and effects thereof can be clearly understood from the following description.

Figure 2:
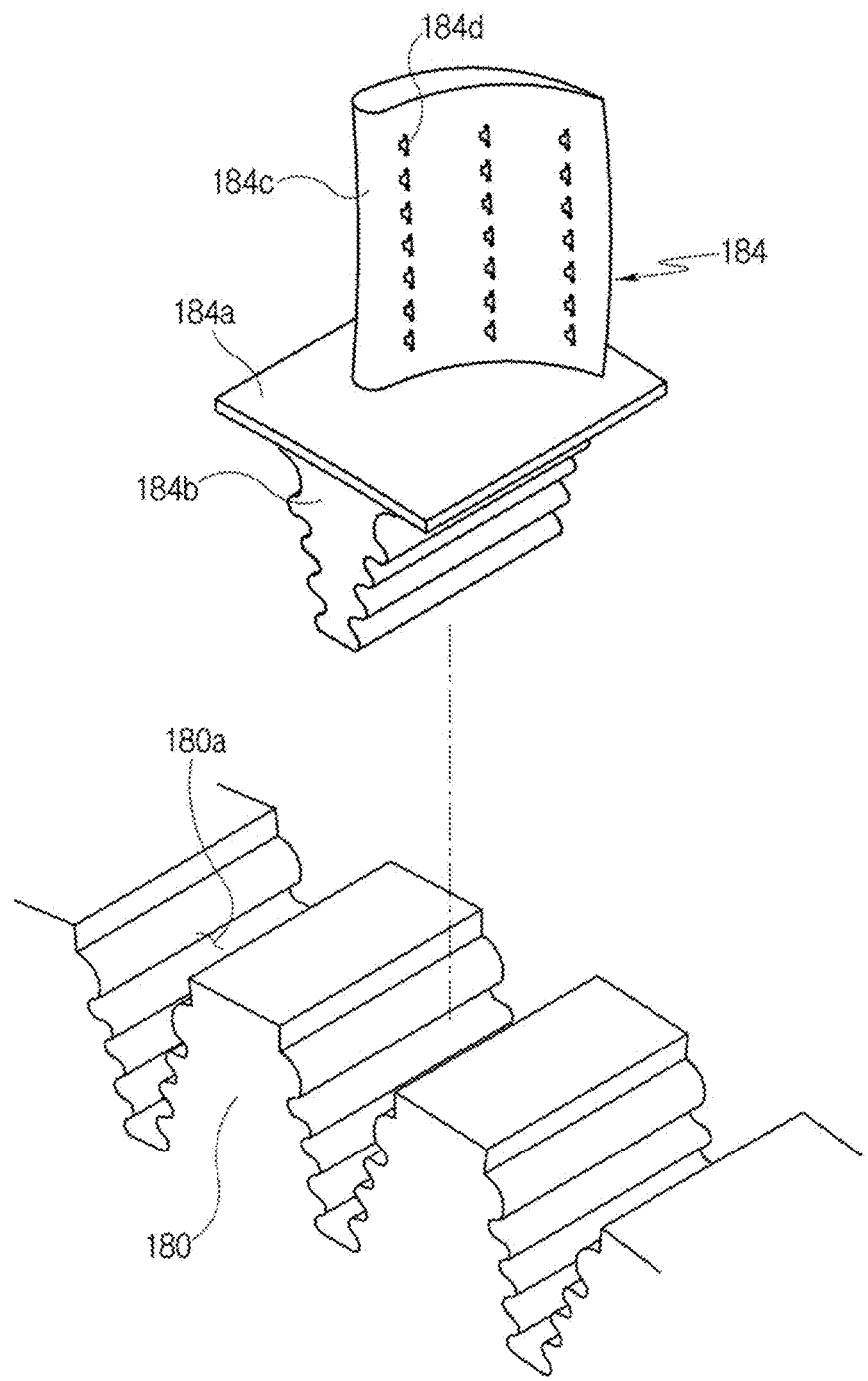
FIGS. 2 and 3 are views illustrating a turbine blade of a gas turbine according to an embodiment of the present invention.
Figure 3:
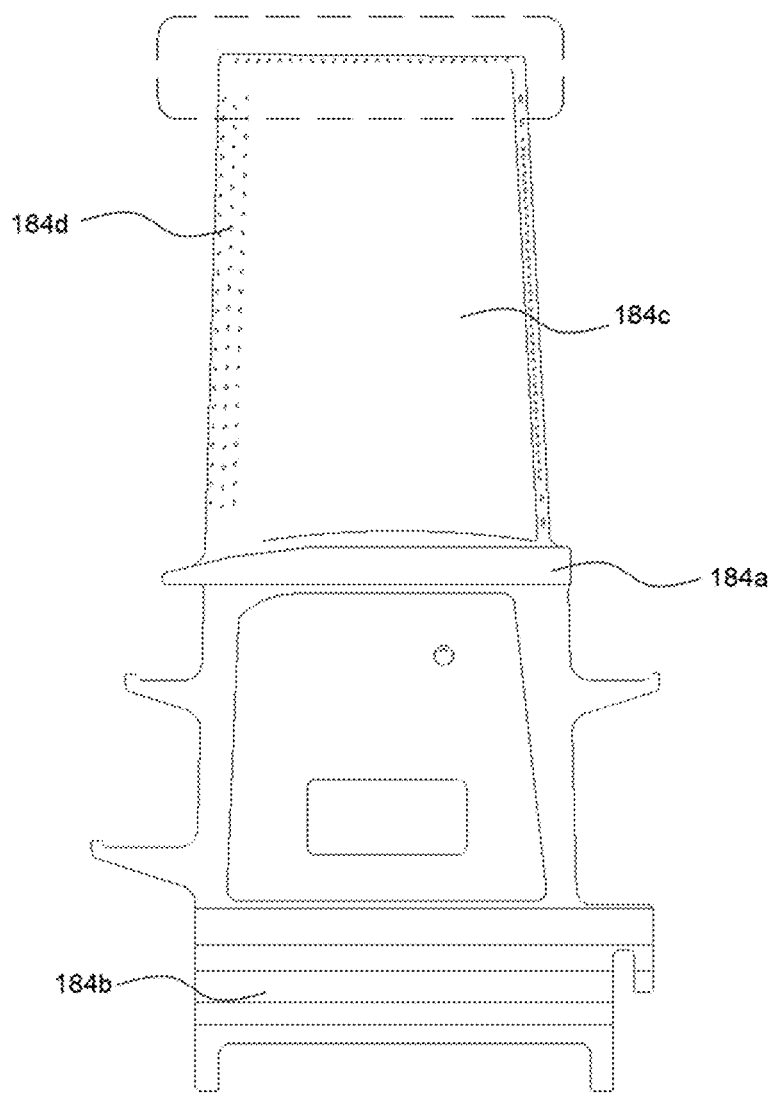
Figure 4:
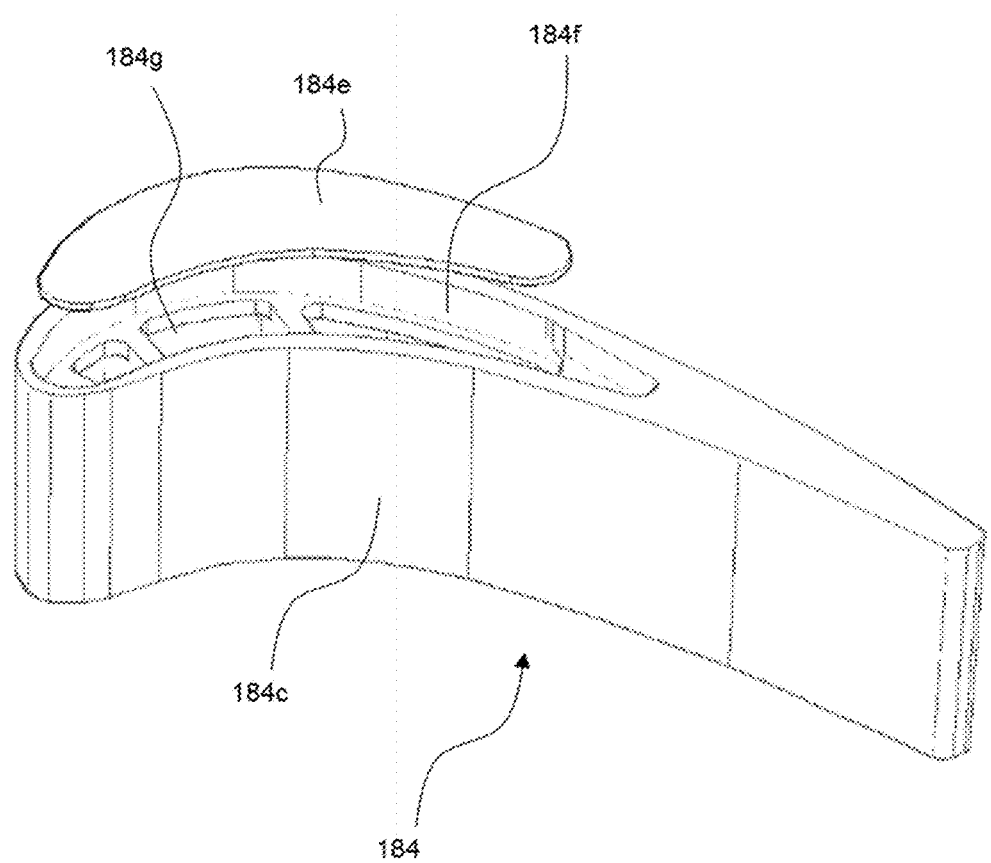
FIG. 4 is a view illustrating an upper end of a turbine blade according to an embodiment of the present invention.
Figure 5:
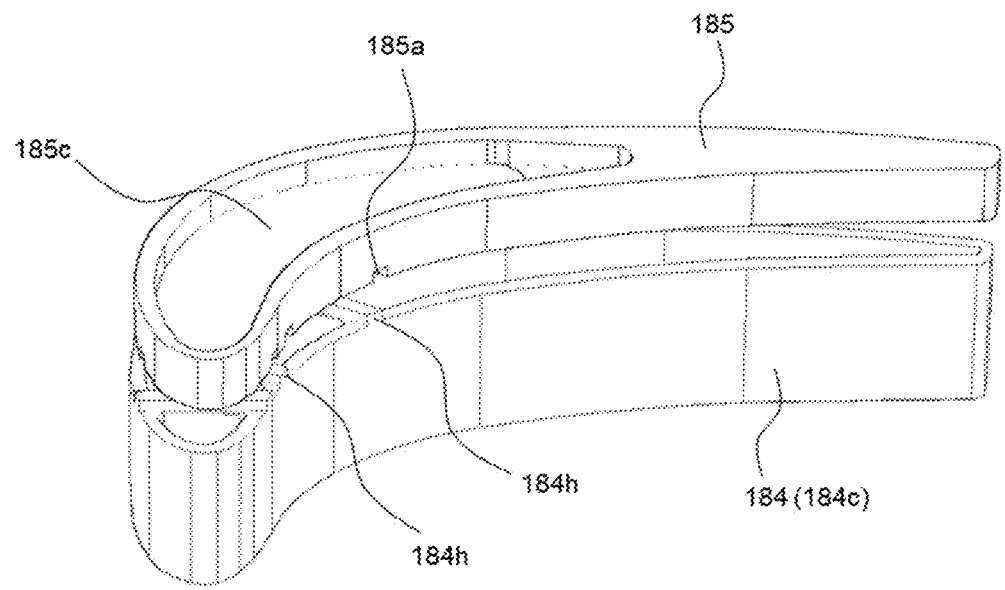
FIG. 5 is a view illustrating a turbine blade having a cast tip according to an embodiment of the present invention.
Figure 5:
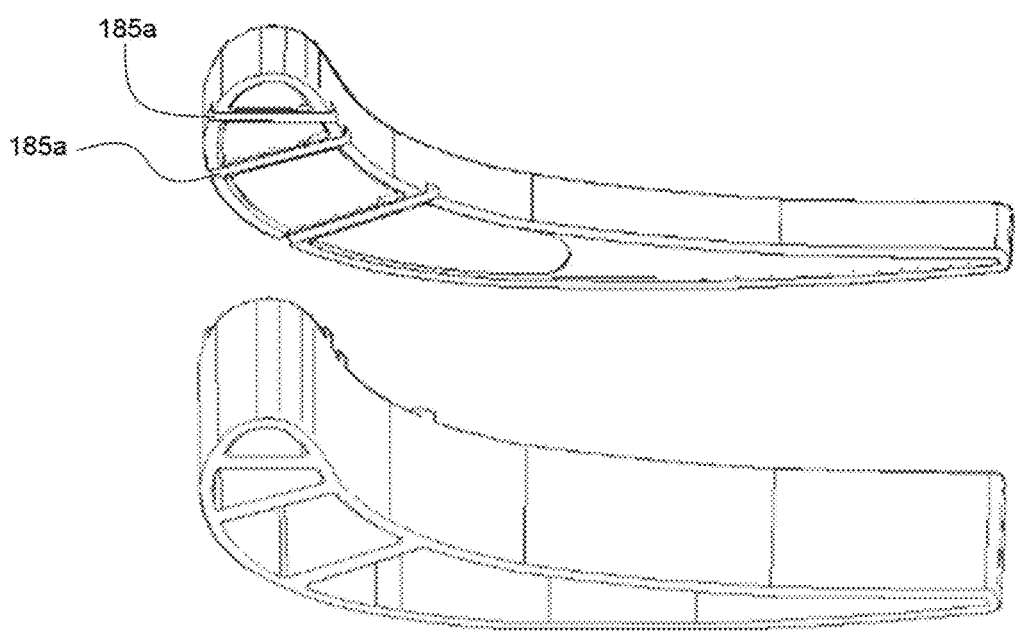
Figure 6:
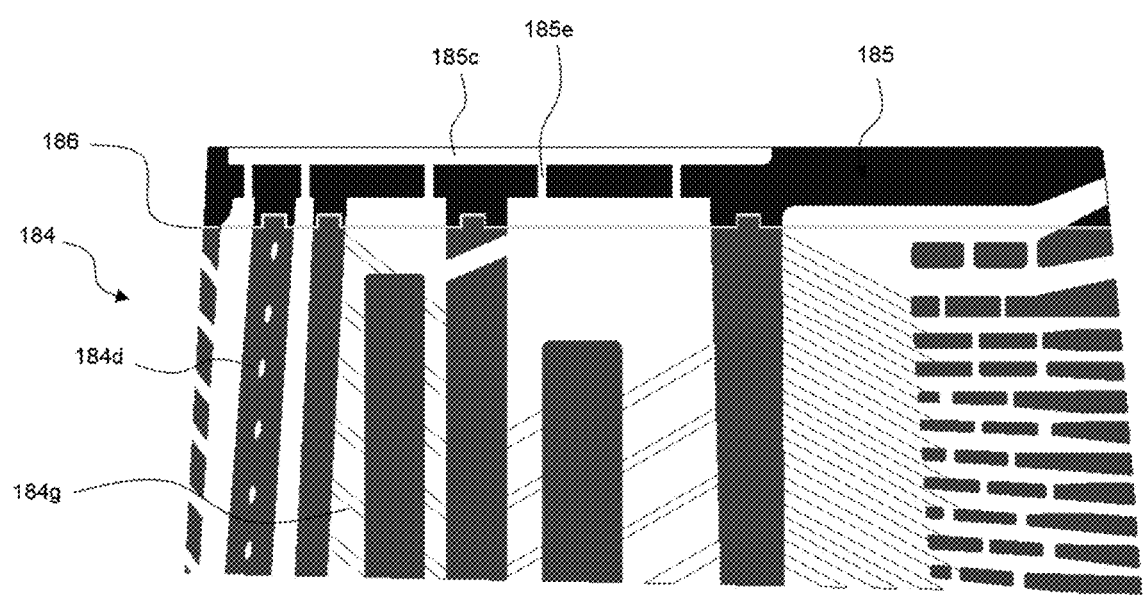
FIG. 6 is a cross-sectional view illustrating an assembly of a cast tip and a turbine blade part according to an embodiment of the present invention.

FIG. 1 is a view illustrating an overall structure of a gas turbine, and FIGS. 2 and 3 are views illustrating a turbine blade of a gas turbine according to an embodiment of the present invention. FIG. 4 illustrates an upper end of a turbine blade while FIG. 5 illustrates a turbine blade combined by a cast tip according to an embodiment of the present invention. FIG. 6 is a cross-sectional view of a cast tip and a turbine blade assembly according to an embodiment of the present invention.

The gas turbine 100 includes a housing 102 and a diffuser 106. The diffuser 106 is installed at the rear of the housing 102 to discharge combustion gases passed through the gas turbine 100. The gas turbine 100 further includes a combustor 104 disposed at a portion between a compressor and the diffuser 106, and the combustor 104 receives compressed air and then combusts fuel that is mixed with the compressed air.

Based on an air flow direction, a compressor section 110 is located upstream of the combustion 10, and a turbine section 120 is located downstream thereof. A torque tube 130 is disposed between the compressor section 110 and the turbine section 120 and serves as a torque transfer member to transfer torque generated by the turbine section 120 to the compressor section 110.

The compressor section 110 includes a plurality of compressor rotor disks 140 which are fastened by a single tie bolt 150 or multiple tie bolts to prohibit them from being separated from each other along an axial direction.

Specifically, the compressor rotor disks 140 are aligned along the axial direction by using the tie bolts 150 inserted through central portions of the compressor rotor disks 140. The facing surfaces of the adjacent compressor rotor disks 140 are pressed against each other by the tie bolts 150 such that the compressor rotor disks 140 cannot rotate relative to each other.

The compressor rotor disk 140 has a plurality of blades 144 coupled to the outer circumferential surface thereof. The compressor blades 144 are radially disposed and each has a root part 146 fastened to the compressor rotor disk 140.

A vane is disposed between the respective compressor rotor disks 140 and fixed to the housing. Unlike the compressor rotor disks, the vane fixed to the housing does not able to rotate. The vane serves to align a flow of compressed air passed through the blades of the compressor rotor disk and guide the compressed air to the blades of another rotor disk located in the downstream side.

The root part 146 may be fastened in a tangential type or axial type. The root part 146 may be fastened through a fastening type which is selected according to a structure required by a gas turbine. The fastening type may include a dove-tail shape or a fir-tree shape. The fastening type is not limited thereto and may be modified into another fastener, for example, a key or a bolt.

The tie bolts 150 is disposed through the central portions of the plurality of compressor rotor disks 140. One end of the tie bolt 150 is fastened to the inside of the compressor rotor disk located in the most upstream side and the other end is fixed to the inside of the torque tube 130 or aft end compressor disk.

Since the tie bolt 150 may include various structures depending on the gas turbine, the shape of the tie bolt 150 is not limited to the shape illustrated in FIG. 1. For example, one tie bolt may be disposed through the central portions of the rotor disks as illustrated in FIG. 1, or a plurality of tie bolts may be arranged on the circumferences of the rotor disks. The two structures can be used together.

The combustor 104 mixes the compressed air with fuel and combusts the fuel mixture to generate high-temperature combustion gas with high energy, thereby raising the temperature of the combustion gas to a heat-resistant limit of the combustor and the turbine through an isobaric combustion process.

The combustion system of the gas turbine may include a plurality of combustors in a casing formed in a cell shape. Each combustor may include a burner having a fuel injection nozzle and the like, a combustor liner constituting a combustion chamber, and a transition piece serving as a connection part between the combustor and the turbine.

Specifically, the combustor liner provides a combustion space in which fuel injected by the fuel injection nozzle is mixed with the compressed air pressured by the compressor and the mixture of the fuel and compressed air can be combusted. The combustor liner may include a flame tube to provide the combustion space in which the fuel mixture is combusted and a flow sleeve forming a ring-shaped space while surrounding the flame tube. The fuel injection nozzle is coupled to the front end of the combustor liner and an ignition plug may be coupled to the sidewall of the liner.

The transition piece is connected to aft end of the combustor liner in order to transfer the high temperature combustion gas toward the turbine. The outer wall of the transition piece is cooled by the compressed air supplied from the compressor to keep the transition piece from being damaged due to the high-temperature combustion gas.

The high-temperature combustion gas coming out of the combustor is supplied to the turbine section 120. The high-temperature combustion gas is expanded and consequently apply a driving force or a reaction force to the rotating blades of the turbine, thereby generating torque to the turbine blades. Since the turbine blades are coupled to the torque tube 130, the torque generated can be transferred to the compressor section 110. In addition, power exceeding the power required for driving the compressor may be used to drive a generator or the like.

The turbine section 120 basically has a similar structure to the compressor section 10. The turbine section 120 includes a plurality of turbine rotor disks 180 similar to the compressor rotor disks 140 of the compressor section 110. Therefore, each of the turbine rotor disks 180 may include a plurality of turbine rotor blades 184 arranged in a radial shape. The turbine rotor blades 184 may also be coupled to the turbine rotor disk 180 through dove tail-shaped parts or the like.

Furthermore, a turbine stator (or a turbine vane) which is fixed to the housing is disposed between the turbine rotor blades 184 of the turbine rotor disk 180 and guides a flow direction of combustion gas passing through the blades. The turbine stator may be provided with a plurality of vane segments.

Referring to FIG. 2, the turbine rotor disk 180 has a circular plate shape and includes a plurality of coupling slots 180a formed at the outer circumference thereof. The coupling slot 180a has an uneven surface while having a fir tree-shaped cross-section.

The turbine blade 184 is fastened to the coupling slot 180a. The turbine blade 184 of FIG. 2 has a plate-shaped platform part 184a formed in the central portion thereof. The platform part 184a has a side surface which is in contact with a side surface of the platform part 184a of the adjacent turbine blade and serves to maintain the space between the blades. The platform part 184a has a root part 184b formed at the bottom thereof. The root part 184b has a so-called axial-type structure that is inserted into the coupling slot 180a of the turbine rotor disk 180 along the axial direction of the turbine rotor disk 180.

The root part 184b has an uneven surface, while having a fir tree-shaped cross-section corresponding to the shape of the coupling slot 180a. The coupling structure of the root part 184b is not limited to the fir tree shape, but may be modified into other structures to fasten the turbine blade 184 into turbine rotor disk 180, such as a dove tail shape.

A blade part 184c may be provided on the platform part 184a. The blade part 184c has a blade shape that is optimized according to the specification of the gas turbine and includes a leading edge and a trailing edge. Based on the flow direction of the combustion gas, the leading edge is disposed in the upstream side and the trailing edge is disposed in the downstream side.

Unlike the blades of the compressor section, the blades of the turbine section come in direct contact with high-temperature combustion gas. Due to the high temperature of the combustion gas reaching approximately 1,700° C., it is mandatory to cool the turbine blades 184. For example, a cooling flow path may be formed therein, where compressed air may be extracted from portions of the compressor section and then supplied toward the blades of the turbine section so as to cool down the turbine blades.

The cooling flow path may be extended outside the housing (external flow path) or extended through the rotor disks (internal flow path). The blade part 184c of FIG. 2 has a plurality of cooling holes 184d formed on the surface thereof. The cooling holes 184d communicate with a cooling flow path formed inside the blade part 184c and supplies cooling air to the surface of the blade part 184c.

The radial end portion of the blade part 184c is adjacent to the turbine housing. The high-temperature combustion gas is injected into the turbine blade 184 and the turbine blade 184 is rotated using the energy of the combustion gas. Therefore, the leakage of the high-temperature combustion gas outside the design flowpath results in the reduced efficiency of the turbine. To inhibit such a decrease in the turbine efficiency, a turbine tip clearance, which is an interval between the turbine blade 184 formed along the radial direction of the blade part 184c and the turbine housing, should be minimized to thereby improve the turbine efficiency. Here, the turbine tip clearance may not remain uniform during the gas turbine service, but it may be changed due to the thermal expansion in the turbine blade 184 due to the contact with the high-temperature combustion gas. When the turbine tip clearance is increased, the leakage of the combustion gas occurs, giving rise to reduction in the turbine efficiency. In the other hand, when the turbine tip clearance becomes smaller, the turbine blade 184 rotating at high speed may make direct contact with the turbine housing, which may cause severe damage to the turbine blade 184 presumably due to heating, friction, or oxidation therefrom.

Therefore, as shown in FIG. 4, a tip pocket 184f may be formed at an upper end of the blade part 184c and a tip plate 184e covering the tip pocket 184f may be installed on the upper end of the blade part 184c. However, the upper end of the blade part 184c, i.e., the tip plate 184e and the tip pocket 184f may be oxidized or damaged by high-temperature friction when the turbine blade 184 encounters harsh operating conditions, such as heating due to the contact with the high-temperature high-pressure combustion gas or the reduced turbine tip clearance.

In order to solve such a problem, the turbine blade 184 according to an embodiment of the present invention may be provided with a cast tip 185 placed at the upper end of the blade part 184c.

The cast tip 185 may be placed on the upper end of the blade part 184c along the radial direction, and may have a cross-section formed that is substantially identical as the blade part 184c. FIG. 5 illustrates the cast tip 185. An assembly of the cast tip 185 and the blade part 184c may serve as a single turbine blade. Thus, the cross-section of the cast tip 185 may be preferably in the form of an air foil shape like the blade part 184c, and has a leading edge and a trailing edge.

The cast tip 185 as shown FIG. 5 has a predetermined thickness, that is generally thicker than that of the conventional tip plate 184e. The conventional tip plate 184e is formed in a structure having a thin plate shape to cover the tip pocket 184f. However, the cast tip 185 according to an embodiment of the present invention preferably has a certain thickness to form a single turbine blade when it is combined with the turbine blade part 184c.

As described above, the turbine blade part 184c rotates at a high speed due to the jet expansion of the high-pressure combustion gas. Further, thermal expansion resulting from the contact with the high-temperature combustion gas or thermal shrinkage due to cooling occurs in the blade part 184c. As a result, the upper end of the blade part 184c may often be oxidized or damaged due to these harsh operating conditions. Although welding is used to restore the upper end of the damaged blade part 184c, the welding restoration may frequently cause a change in the turbine blade metallurgical make up or alteration in the surface treatment thereof, which can subsequently leads to accelerated wear severe situations in the turbine blade 184 rotating at a high speed and drastically reduces the service life of the turbine blade 184.

Upon the breakage or degradation of the upper end of the blade part 184c, the turbine blade 184 having the cast tip 185 according to an embodiment of the present invention may be easily restored by simply replacing the cast tip 185. Moreover, it is possible to preclude the problems of the surface treatment or the weight change by replacing the cast tip 185 having the same dimension and similar chemical composition. Thus, the service life of the turbine blade 184 may be enhanced.

Referring to FIG. 5, the cast tip 185 includes a slot 185a at a surface coupled to the blade part 184c to allow the cast tip 185 and the blade part 184c to be easily coupled with each other. Since the turbine blade 184 rotates at high speed, it is important that the assembly of the cast tip 185 and the blade part 184c maintains a continuous air-foil shape when the cast tip 185 is coupled to an upper portion of the blade part 184c. Therefore, it may be necessary that the blade part 184c and the cast tip 185 have the same cross-sectional shape. Further, in order for them to be coupled with each other at the correct position, a slot 185a may be formed a lower surface of the cast tip 185, whereas a protrusion 184h may be provided on an upper surface of the blade part 184c, i.e., the surface coupled to the cast tip 185.

The slot 185a and the protrusion 184h as shown in FIG. 5 are in the form of a female slot and a male boss, respectively, having a substantially similar rectangular cross-section. However, according to an embodiment of the present invention, the female slot and the male boss of the cast tip 185 and the blade part 184c of the turbine blade 184, respectively, are not limited to the rectangular cross-section, but may be modified to various shapes to facilitate the coupling of the cast tip 185 and the blade part 184c. For example, the female slot and the male boss may have a semicircular cross-sectional shape, or the male boss may be provided on the cast tip 185 to protrude therefrom and the female slot may be provided on the blade part 184c to receive the male boss. The female slot and the male boss may be modified into various shapes to allow the blade part 184c and the cast tip 185 to be precisely coupled to each other.

The cast tip 185 may be integrally formed with the tip plate 184e so that a separate tip plate 184e may not be necessary. As shown in FIG. 5, for the turbine blade 184 having the tip plate integrated into the cast tip 185, the maintenance of the turbine blade 184 may be performed more simply and efficiently because the damaged cast tip 185 can be simply replaced with a new one.

In addition, a cast tip pocket 185c may be formed at one end or both ends of the cast tip 185 according to an embodiment of the present invention to inhibit thermal expansion or enable more efficient cooling. FIG. 5 shows that the cast tip pocket 185c is installed on a side opposite to a surface where the cast tip 185 is coupled to the blade part 184c. However, the cast tip pocket 185c may be provided at the upper or lower surface of the cast tip 185 as needed, and the position where the integrated tip plate is placed may be changed according to an installation position of the cast tip pocket 185c.

The cast tip 185 is mounted to the upper surface of the blade part 184c to form an integrated turbine blade 184. Accordingly, the cast tip 185 is brought into contact with the high-temperature high-pressure combustion gas, and thus, proper cooling is required. To this end, the cast tip 185 according to an embodiment of the present invention may further include cast tip cooling holes 185e, as shown in FIG. 6. FIG. 6 shows a cross-section of the cast tip 185 coupled to the upper surface of the blade part 184c. The cast tip cooling holes 185e provided in the cast tip 185 may be formed to penetrate the cast tip 185 in a radial direction of the turbine blade.

The turbine blade 184 is heated to high-temperature due to the high-temperature combustion gas. Various cooling flow paths are formed inside the turbine blade 184 to increase the efficiency of the gas turbine. The cooling flow paths are also helpful to maintain the service life of the turbine blade 184 longer. As shown in FIG. 6, internal cavities 184g are formed inside the blade part 184c, which are aimed at cooling the turbine blade part 184c using the compressed air.

Here, the cast tip cooling holes 185e formed in the cast tip 185 may be connected to the internal cavity 184g or film cooling holes 184d provided at the blade part 184c to cool the blade part 184c. Therefore, the turbine blade 184 in which the blade part 184c and the cast tip 185 are integrated may be cooled more efficiently by flowing the compressed air extracted from the compressor through the cooling flow path connecting the internal cavity 184g, the film cooling holes 184d, and the cast tip cooling holes 185e.

The cooling flow path of the cast tip 185 according to an embodiment of the present invention should not be limited to the cast tip cooling holes 185e shown in the drawing. Although exemplary cast tip cooling holes 185e for cooling the cast tip 185 are illustrated in FIG. 6, they may be modified into various other structures to cool the turbine blade and/or the cast tip, which eventually has an influence on increasing the turbine performance and service life.

Various methods may be used to securely couple the blade part 184c with the cast tip 185 according to an embodiment of the present invention. For example, a braze joint 186 may be formed on a surface where the cast tip 185 and the blade part 184*c* are attached to each other. The braze joint 186 is advantageous especially in terms of repairing the cast tip 185. Specifically, when the cast tip 185 is oxidized or broken due to high-temperature or friction, the cast tip 185 may be replaced instead of replacing the entire blade part 184*c*. When the cast tip 185 and the blade part 184*c* are coupled by the braze joint 186, the broken cast tip 185 may be easily separated from the blade part 184*c* by apply heat therefor, and this makes it easier to repair the damaged cast tip.

Hereinafter, a procedure for replacing the cast tip 185 of the turbine blade 184 according to an embodiment of the present invention will be described in detail with reference to the accompanying drawings.

First, upon the receipt of the turbine blade 184 damaged during operation, the existing tip plate 184*e* is removed from the turbine blade and a surface of the turbine blade is machined to the required specifications.

The blade part 184*c* of the turbine blade and the cast tip 185 are then heated, and the braze foil in a suitable size is disposed at one end of the blade part 184*c* for the coupling of the blade part 184*c* and the cast tip 185.

The cast tip 185 is placed on the braze foil, and the slot 185*a* and the protrusion 184*h* as described above are aligned. In this process, it is required to maintain small gaps between the slot 185*a* and the braze foil and between the braze foil and the protrusion 184*h* to allow the braze foil to flow.

Then, by applying heat to the braze foil, the cast tip 185 and the upper end of the blade part 184*c* are attached to each other to thus form an assembly.

The brazing procedure is applied in Full Diffusion Transient Liquid Phase, and may be performed in a vacuum furnace having proper temperatures, ramp rates, and dwell time. The operating conditions of the furnace, i.e., temperatures, ramp rates, and dwell time, may be varied according to the coupling conditions for the cast tip 185 and the blade part 184*c*.

The assembly of the cast tip 185 and the blade part 184*c* is removed from the vacuum furnace, the excess braze are removed, and the coupling face are checked.

The procedures to replace the cast tip 185 of the turbine blade 184 according to an embodiment of the present invention are summarized as follows.

1. Engine-run blade is received from customer, then stripped and cleaned, and inspected.
2. Blade tip is removed via machining process per engineering specification.
3. Blade is heat treated, repaired and inspected.
4. Blade tip is final machined to accept a new cast tip.
5. New replacement tip is cast and manufactured per the alloy specification.
6. New replacement tip is heat treated and machined per specifications.
7. Blade and cast tip are cleaned and prepped for joining.
8. Braze foil is trimmed to correct geometry and set on prepared blade tip.
9. Cast tip is set on top of foil braze and installed to where the boss/key features are locked into blade grooves.
10. There is a specific gap between key, slot and braze foil to allow for proper braze "wetting" and capillary action.
11. Cast tip is tack welded to blade to secure assemblies during braze heat treat cycle.
12. Heat treat cycle is applied for Full Diffusion Transient Liquid Phase braze in controlled atmosphere vacuum furnace while using specific temperatures, ramp rates and dwell times.
13. Blades with new tips are removed from the furnace so that excess braze can be blended from surface and the joint can be inspected.
14. The braze joint is set up and machined around the outside blade perimeter to a depth approximately 50% of the wall thickness; preparation for perimeter weld process
15. For additional joining security, the external surface of braze joint is welded (via Micro Plasma, GTAW, EB Weld or Laser Weld Processes) using H230 alloy filler or similarly comparable materials.
16. Excess weld material is blended from blade surface and contoured to match adjacent blade geometry
17. Blades are NDE inspected then prepared to finish remaining typical repair processes: (EDM of cooling holes, final tip grinding to achieve specific blade height and airfoil/tip TBC (Protective thermal spray coatings) and remaining diffusion and age het treatments Although the rotating blades have been described in detail above through exemplary embodiments, the present disclosure is not limited thereto and should be construed as having the widest range according to the basic spirit disclosed herein. Those skilled in the art may implement a pattern of a form not stated above by combing or replacing the disclosed exemplary embodiments, which should also be construed as within the scope of the present disclosure. Further, it will be apparent to those skilled in the art that various modifications and variation can be easily made to these exemplary embodiments without departing from the spirit or scope of the claims.

What is claimed is:

1. A turbine blade of a gas turbine, comprising:
a turbine blade part having an airfoil shape including an internal cavity;
a cast tip disposed at an upper portion of the turbine blade part, the cast tip including a suction surface and a pressure surface, the suction and pressure surfaces corresponding to the airfoil shape of the turbine blade part, the suction and pressure surfaces connected to each other by a bottom surface of the cast tip and by an upper surface of the cast tip; and
a braze joint attaching the cast tip to the turbine blade part,
wherein a first connecting surface of the turbine blade part attached to the cast tip has a same cross-sectional shape as a second connecting surface of the cast tip that is attached to the turbine blade part,
wherein the cast tip further includes a cast tip pocket formed in at least one of the bottom surface of the cast tip and the upper surface of the cast tip and configured to reduce heat friction when an assembly of the cast tip and the turbine blade part rotates, and
wherein the cast tip pocket includes a continuous inner surface and a recessed surface having a perimeter connected to the continuous inner surface, the continuous inner surface having a shape corresponding to the suction and pressure surfaces of the cast tip.

2. The turbine blade of claim 1, wherein the turbine blade part further includes a protrusion disposed at the first connecting surface where the turbine blade part is attached to the cast tip.

3. The turbine blade of claim 2, wherein the cast tip includes a concave portion at the second connecting surface where the cast tip is attached to the turbine blade part, the concave portion interconnected with the protrusion of the turbine blade part when the cast tip is attached to the turbine blade part.

4. The turbine blade of claim 3, wherein the protrusion is a male boss and the concave portion is a female slot to accommodate the male slot, the male boss having a height that is substantially equal to a depth of the female slot.

5. The turbine blade of claim 1, wherein the internal cavity of the turbine blade part includes a cooling flow passage communicating with a plurality of film cooling holes provided on an outer surface of the turbine blade part.

6. The turbine blade of claim 5, wherein the cast tip is provided with a plurality of cooling holes penetrating the cast tip, each of the plurality of cooling holes having one end connected to the internal cavity of the turbine blade part to allow cooling air to pass through the cast tip.

7. The turbine blade of claim 1, wherein
the turbine blade part includes a concave portion disposed at the first connecting surface where the turbine blade part is attached to the cast tip, and
the cast tip includes a protrusion at the second connecting surface where the cast tip is attached to the turbine blade part, the protrusion interconnected with the concave portion of the turbine blade part when the cast tip is attached to the turbine blade part.

8. The turbine blade of claim 7, wherein the internal cavity of the turbine blade part includes a cooling flow passage communicating with a plurality of film cooling holes provided on an outer surface of the turbine blade part.

9. The turbine blade of claim 8, wherein the cast tip is provided with a plurality of cooling holes penetrating the cast tip, each of the plurality of cooling holes having one end connected to the internal cavity of the turbine blade part to allow cooling air to pass through the cast tip.

10. A gas turbine generating power, comprising:
a compressor compressing air received from the outside;
a combustor disposed downstream of the compressor, mixing the compressed air supplied from the compressor with fuel, and combusting the mixture at a constant pressure to produce a high energy combustion gas;
a turbine having a turbine blade and to which a high-temperature combustion gas produced in the combustor is supplied; and
a rotating shaft connected to the compressor and the turbine to deliver rotation power generated in the turbine to the compressor, resulting in rotation of the compressor,
wherein the turbine blade comprises:
a turbine blade part having an airfoil shape including an internal cavity therein;
a cast tip disposed at an upper portion of the turbine blade part, the cast tip including a suction surface and a pressure surface, the suction and pressure surfaces corresponding to the airfoil shape of the turbine blade part, the suction and pressure surfaces connected to each other by a bottom surface of the cast tip and by an upper surface of the cast tip; and
a braze joint attaching the cast tip to the turbine blade part,
wherein a first connecting surface of the turbine blade part attached to the cast tip has a same cross-sectional shape as a second connecting surface of the cast tip that is attached to the turbine blade part,
wherein the cast tip further includes a cast tip pocket formed in at least one of the bottom surface of the cast tip and the upper surface of the cast tip and configured to reduce heat friction when an assembly of the cast tip and the turbine blade part rotates, and
wherein the cast tip pocket includes a continuous inner surface and a recessed surface having a perimeter connected to the continuous inner surface, the continuous inner surface having a shape corresponding to the suction and pressure surfaces of the cast tip.

11. The gas turbine of claim 10, wherein
the turbine blade part further includes a protrusion disposed at the first connecting surface where the turbine blade part is attached to the cast tip, and
the cast tip includes a concave portion at the second connecting surface where the cast tip is attached to the turbine blade part, the concave portion interconnected with the protrusion of the turbine blade part when the cast tip is attached to the turbine blade part.

12. The gas turbine of claim 10,
wherein the internal cavity of the turbine blade part includes a cooling flow passage communicating with a plurality of film cooling holes provided on an outer surface of the turbine blade part, and
wherein the cast tip is provided with a plurality of cooling holes penetrating the cast tip, each of the plurality of cooling holes having one end connected to the internal cavity of the turbine blade part to allow cooling air to pass through the cast tip.

13. A procedure of replacing a cast tip, comprising:
removing an existing cast tip from a turbine blade part upon receiving a turbine blade damaged during operation;
machining a surface of the turbine blade part to predetermined specifications;
heating the turbine blade part and the cast tip;
placing a braze foil at one end of the turbine blade part;
placing a new cast tip on the braze foil while aligning a protrusion provided on the surface of the turbine blade part and a concave portion provided on a surface of the new cast tip; and
applying heat to the braze foil to allow the cast tip and the turbine blade part to be attached to each other to form an assembly,
wherein the new cast tip placed on the braze foil includes a cast tip pocket formed in at least one of a bottom surface of the cast tip and an upper surface of the cast tip, the cast tip pocket including a continuous inner surface and a recessed surface having a perimeter connected to the continuous inner surface, the continuous inner surface having a shape corresponding to an airfoil shape of the surface of the turbine blade part.

14. The procedure of claim 13, wherein
the protrusion provided on the first connecting surface of the turbine blade part is a male boss and
the concave portion provided on the second connecting surface of the new cast tip is a female slot.

15. The procedure of claim 14, wherein at the placing of the new cast tip on the braze foil, a predetermined amount of gap is formed between the slot and the braze foil or between the braze foil and the protrusion to allow the braze foil to flow.

16. The procedure of claim 15, wherein the applying heat to the braze foil to allow the cast tip and the turbine blade part to be attached to each other to form an assembly is performed in a vacuum furnace.

17. The procedure of claim 16, further comprising
removing the assembly of the cast tip and the turbine blade part from the vacuum furnace and removing excess braze from the assembly of the cast tip and the turbine blade part.

\* \* \* \* \*